(12) United States Patent
Konishi

(10) Patent No.: US 10,295,646 B2
(45) Date of Patent: May 21, 2019

(54) POSITIONING DEVICE, POSITIONING SYSTEM, POSITIONING METHOD, AND COMPUTER-READABLE MEDIUM

(71) Applicant: NEC Corporation, Tokyo (JP)

(72) Inventor: Yusuke Konishi, Tokyo (JP)

(73) Assignee: NEC Corporation, Tokyo (JP)

( * ) Notice: Subject to any disclaimer, the term of this patent is extended or adjusted under 35 U.S.C. 154(b) by 460 days.

(21) Appl. No.: 14/670,509

(22) Filed: Mar. 27, 2015

(65) Prior Publication Data

US 2015/0276915 A1 Oct. 1, 2015

(30) Foreign Application Priority Data

Mar. 28, 2014 (JP) ................. 2014-067610

(51) Int. Cl.
*G01S 1/68* (2006.01)
*G01S 5/02* (2010.01)

(52) U.S. Cl.
CPC . *G01S 1/68* (2013.01); *G01S 5/02* (2013.01)

(58) Field of Classification Search
CPC . G01S 1/68; H04K 3/86; H04W 12/00–12/12
See application file for complete search history.

(56) References Cited

U.S. PATENT DOCUMENTS

| | | | | |
|---|---|---|---|---|
| 9,241,262 B2* | 1/2016 | Graube | ................. | H04W 12/02 |
| 9,549,325 B2* | 1/2017 | Huh | ................. | H04W 4/008 |
| 2014/0273857 A1* | 9/2014 | White | ................. | G01S 5/00 |
| | | | | 455/41.2 |
| 2015/0005011 A1* | 1/2015 | Nehrenz | ................. | H04W 4/02 |
| | | | | 455/456.3 |
| 2015/0036823 A1* | 2/2015 | Graube | ................. | H04W 12/02 |
| | | | | 380/274 |
| 2016/0266227 A1* | 9/2016 | Newman | ................. | G01S 1/68 |

FOREIGN PATENT DOCUMENTS

| | | |
|---|---|---|
| JP | 2004-177328 | 6/2004 |
| JP | 2008-124959 | 5/2008 |
| JP | 2010-133823 | 6/2010 |
| JP | 2010-159980 | 7/2010 |
| JP | 2010-217093 | 9/2010 |
| JP | 2010-226707 | 10/2010 |
| JP | 2013-131890 | 7/2013 |

OTHER PUBLICATIONS

P. Bahl et al., "An In-Building RF-based User Location and Tracking System", IEEE Infocom 2000, vol. 2, pp. 775-784, 2000.
Notification of Reasons for Refusal, issued in Japanese Application No. 2014-067610; dated Dec. 19, 2017.
Decision to Grant a Patent in counterpart Japanese Patent Application No. 2014-067610, dated Feb. 27, 2018.

* cited by examiner

*Primary Examiner* — Cassi J Galt
(74) *Attorney, Agent, or Firm* — Finnegan, Henderson, Farabow, Garrett & Dunner, L.L.P.

(57) ABSTRACT

The disclosed embodiments include computer-implemented devices, systems, and methods that determine a position of a terminal device within a communications environment. In one embodiment, a positioning device may include a memory and one or more processors. The one or more processors may be configured to change a variable to be transmitted to a user device, to store the changed variable in the memory, and to output a first signal indicating that the user device is present in a predetermined area, based on a first variable received from the user device and the changed variable stored in the memory.

13 Claims, 7 Drawing Sheets ptimize# POSITIONING DEVICE, POSITIONING SYSTEM, POSITIONING METHOD, AND COMPUTER-READABLE MEDIUM This application is based upon and claims the benefit of priority from Japanese Patent Application No. 2014-067610, filed on Mar. 28, 2014, the disclosure of which is incorporated herein in its entirety by reference.

BACKGROUND

Technical Field

The disclosure generally relates to a positioning device, a positioning system, a positioning method, and a computer-readable medium for detecting the position of a terminal.

Description of the Related Art

GPS (Global Positioning System) is used in the open air for measuring the position or the movement locus of a communication terminal. However, it is often difficult to use GPS indoors or in an urban area where there are many tall buildings, and a method capable of realizing inexpensive and high-speed positioning (measurement of the position or the movement locus) indoors by using an information terminal is being developed.

To detect the position of a mobile communication terminal indoors, a system may include a wireless device such as a wireless LAN (Local Area Network), a mobile phone, or RFID (Radio Frequency IDentification). For example, in some systems, a communication terminal may receive an identifier transmitted from a stationary transmission device, and the position of the communication terminal may be detected by the identifier being returned to the stationary transmission device.

Additional techniques may determine whether the distance between a position indicated by a positioning result and position(s) indicated by at least one past positioning result(s) is equal to or less than a threshold, and may evaluate the positioning reliability based on the determined.

However, although the positioning reliability is evaluated based on the distance determined with respect to the past positioning information, the evaluation may assume that the location of a communication terminal is reliable, and the evaluation may not consider that the location of a communication terminal is falsified. Further, in some systems, a terminal may falsify its position by transmitting, to a positioning server, an identifier of a stationary transmission device that is installed at another location, which is not actually received.

SUMMARY OF THE INVENTION

In certain embodiment, a positioning device includes a memory and one or more processors. The one or more processors may be configured to change a variable to be transmitted to a user device, store the changed variable in the memory, and output a first signal indicating that the user device is present in a predetermined area, based on a first variable received from the user device and the changed variable stored in the memory.

In further embodiments, a positioning system may include the positioning device described above and at least one positioning target terminal. In some aspects, the positioning target terminal receives a variable transmitted at a predetermined interval by the positioning device, and transmits the variable to the positioning device.

In additional embodiments, a positioning method may include changing a variable to be transmitted to a user device, storing the changed variable in a memory, and outputting a first signal indicating that the user device is present in a predetermined area based on a first variable received from the user device and the changed variable stored in the memory.

In other embodiments, a non-transitory computer-readable medium including instructions to cause one or more processors to change a variable to be transmitted to a user device, store the changed variable in a memory, and output a first signal indicating that the user device is present in a predetermined area based on a first variable received from the user device and the changed variable stored in the memory.

In certain embodiments, the positioning device, the positioning method, and the computer-readable medium may determine an authenticity of a position of a positioning target terminal based on a variable received from the positioning target terminal. In some instances, the disclosed embodiments may reduce or prevent falsification of the position of the terminal.

DETAILED DESCRIPTION

Embodiments of the present disclosure will be described with reference to the drawings. In the following description of the drawings, the same or similar portions are denoted with the same or similar reference signs. However, it should be noted that the drawings are schematic. Moreover, please keep in mind that the embodiments described below are examples, and may be changed as appropriate within essentially the same scope.

By way of example, the disclosed embodiments relate to a business model in which, as a result of going to at least one predetermined visiting spot of a stamp rally or the like, a user with a positioning target terminal may earn a predetermined privilege at a location other than the visiting spot. In the following embodiments, a system and the like for preventing falsification of the position of the positioning target terminal whereby one skips going to a visiting spot in such a service will be described.

<First Exemplary Embodiment>
(Positioning System)

Figure 1:
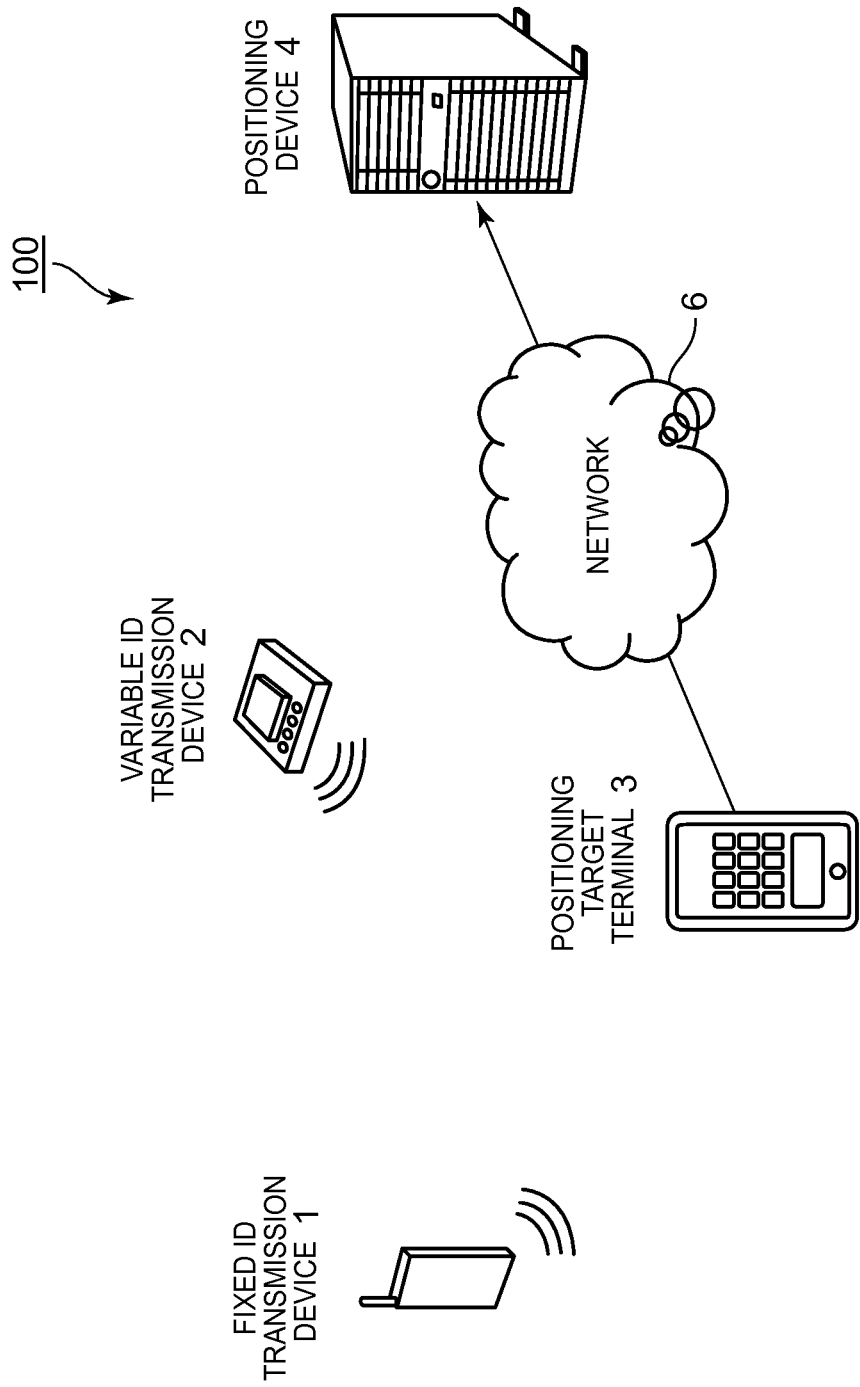
FIG. 1 is a structural diagram of a positioning system according to a first exemplary embodiment.

A positioning system 100 according to a first embodiment will be described with reference to FIG. 1. In certain aspects, positioning system 100 may include a fixed ID (Identifier) transmission device 1, a variable ID transmission device 2, a positioning target terminal 3, and a positioning device 4. The positioning target terminal 3 and the positioning device 4 may be connected by a wired or wireless network 6. In the exemplary embodiment of FIG. 1, positioning system 100 include one fixed ID transmission device 1 and one variable ID transmission device 2, but these are assumed to be present at each one of the at least one visiting spot mentioned above.

By way of example, the fixed ID transmission device 1 may be installed in an environment and may transmits, by wireless communication, a signal including an ID which is identification information for identifying the device. The environment may include at least one fixed ID transmission device 1, and the fixed ID transmission device 1 may transmit a signal including its ID by wireless communication. In some aspects, the ID of the fixed ID transmission device 1 includes identification information allowing received ID authenticity determination section 44 described below to distinguish itself from other fixed ID transmission device 1 and variable ID transmission device 2, and additionally or alternatively, to identify other fixed ID transmission device 1 and variable ID transmission device 2.

For example, positioning system 100 may provide an IEEE (Institute of Electrical and Electronic Engineers) 802.11 wireless LAN system, and an access point of the IEEE 802.11 wireless LAN system may serve as the fixed ID transmission device 1. In some aspects, the access point uses at least any one of its MAC (Media Access Control) address and SSID (Service Set Identifier) as its ID, and regularly transmits a beacon signal including its ID. The positioning target terminal 3, which may correspond to a wireless LAN terminal of the IEEE 802.11 wireless LAN system, may receive the wireless beacon, and return the same to the positioning device 4. The positioning device 4 may thereby measure the position or the movement locus of the positioning target terminal 3. In other aspects, the access point may transmit its ID as a response to an inquiry from the positioning target terminal 3.

In some aspects, the variable ID transmission device 2 transmits a signal including its ID by wireless communication. The ID of the variable ID transmission device 2 may include a variable (which represents identification information) established by the positioning device 4, allowing received ID authenticity determination section 44 described below to distinguish itself from other fixed ID transmission device 1 and variable ID transmission device 2, and additionally or alternatively, to identify other fixed ID transmission device 1 and variable ID transmission device 2. As described above in reference to the fixed ID transmission device 1, positioning system 100 may provide an IEEE 802.11 wireless LAN system, and an access point of the IEEE 802.11 wireless LAN system may serve as the variable ID transmission device 2. In certain aspects, the variable ID transmission device 2 has substantially same functions as the fixed ID transmission device 1. In contrast to the fixed ID transmission device 1 described above, the variable ID transmission device 2 may regularly transmit, to the positioning target terminal 3, a beacon signal including its ID while changing its variable.

Figure 2:
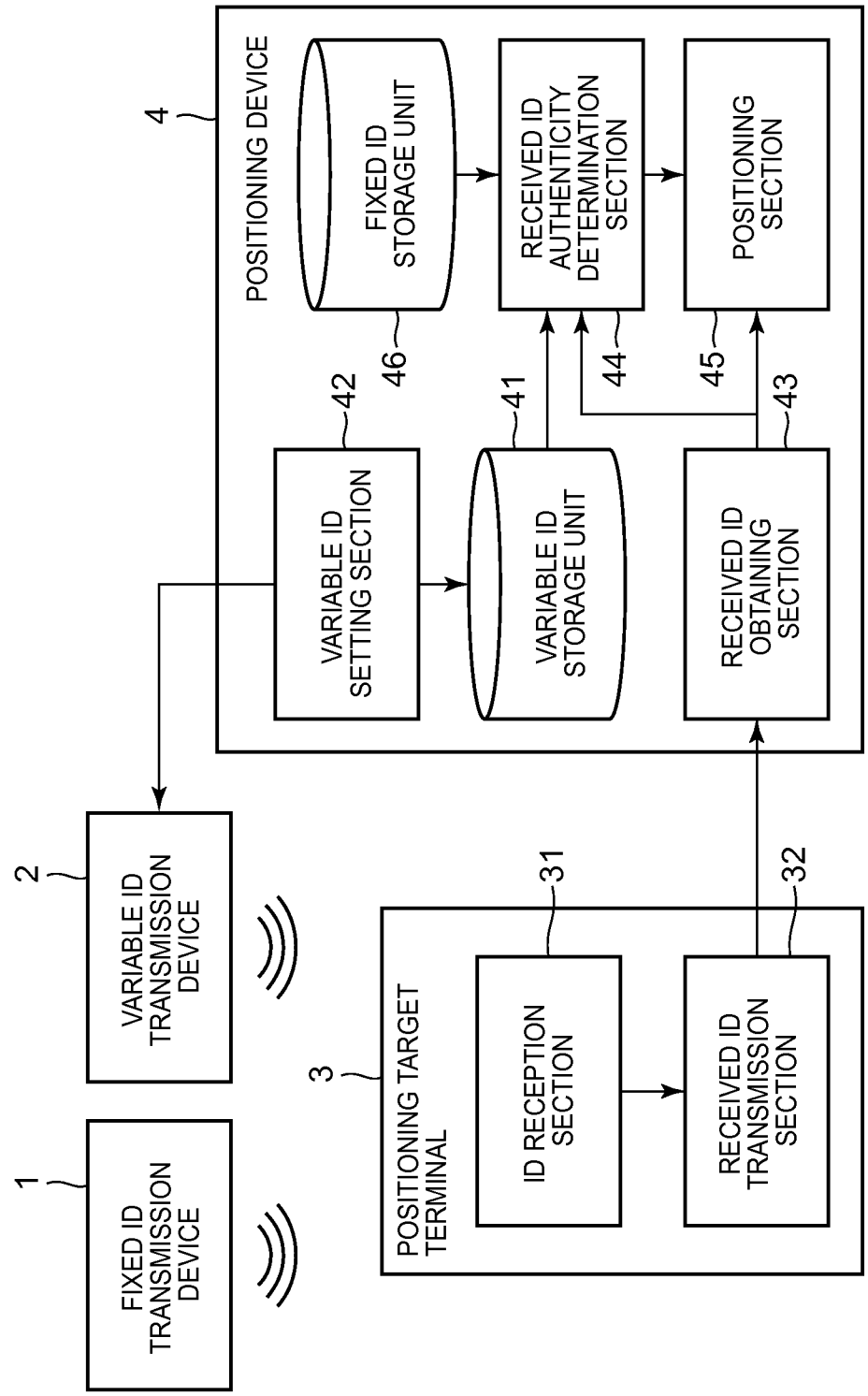
FIG. 2 is a structural diagram of internal blocks of the positioning system according to the first exemplary embodiment.

In an embodiment, the positioning target terminal 3 may include a mobile communication terminal provided to a user and capable of wireless LAN communication. As shown in FIG. 2, the positioning target terminal 3 may include an ID reception section 31, and a received ID transmission section 32. The ID reception section 31 may receive, by wireless communication, beacon signals transmitted by the fixed ID transmission device 1 and/or the variable ID transmission device 2, and may obtain the IDs of the fixed ID transmission device 1 and/or the variable ID transmission device 2 included in the signal(s). The received ID transmission section 32 may transmit at least one ID, which has been obtained by ID reception section 31, to the positioning device 4. The positioning target terminal 3 may, in some instances, measure the reception intensity at the time of reception of the signal, include the intensity in the obtained ID, and transmit the ID to the positioning device 4.

For example, and as described above, positioning system 100 may provide an IEEE 802.11 wireless LAN system. In certain aspects, the positioning target terminal 3 may switch the communication channel used by the positioning target terminal 3, and may receive a beacon signal regularly transmitted by an access point of the IEEE 802.11 wireless LAN system. The positioning target terminal 3 may obtain, as the ID, at least any one of the MAC address and the SSID of the access point included in the received signal. Additionally or alternatively, the positioning target terminal 3 may switch the communication channel used by the positioning target terminal 3, and may transmit inquiry signals to neighboring access points of the IEEE 802.11 wireless LAN system and receive signals which are returned from the neighboring access points. The positioning target terminal 3 may obtain, as the ID, at least any one of the MAC address and the SSID of an access point of the IEEE 802.11 wireless LAN system included in the received signal.

(Positioning Device)

In an embodiment, the positioning device 4 generates, for each variable ID transmission device 2, a variable including a beacon signal to be transmitted by the variable ID transmission device 2, and transmits an ID that includes a corresponding one of the variables to the each variable ID transmission device 2. The positioning device 4 may, for example, detect a position of the positioning target terminal 3 based on at least one ID received from the positioning target terminal 3, and determine an authenticity of the detected position. As shown in FIG. 2, the positioning device 4 includes a variable ID storage unit 41, a variable ID setting section 42, a received ID obtaining section 43, a received ID authenticity determination section 44, a positioning section 45, and a fixed ID storage unit 46.

The variable ID storage unit 41 may hold the ID that includes the variable of the variable ID transmission device 2. The variable ID storage unit 41 may also store transmission history of the ID therein.

The variable ID setting section 42 may change the variable included in the ID of the variable ID transmission device 2 at a predetermined interval, and may store the changed ID, which includes the changed variable, in the variable ID storage unit 41.

The received ID obtaining section 43 may obtain an ID of the fixed ID transmission device 1 and/or an ID of the variable ID transmission device 2, which may be received by the positioning target terminal 3. The variable ID setting section 42 may set, as the variable of the variable ID transmission device 2, a serially-numbered variable, a variable generated according to a rule set in advance, or a randomly generated variable. Additionally or alternatively, the variable ID transmission device 2 may receive IDs transmitted by other fixed ID transmission devices 1 and variable ID transmission devices 2 existing in the neighborhood, and may set an ID not used by these devices as its ID.

The received ID authenticity determination section 44 may determine the authenticity of a received ID obtained by the received ID obtaining section 43 based on at least one ID obtained by the received ID obtaining section 43 and the ID stored in the variable ID storage unit 41. The received ID authenticity determination section 44 may determine the authenticity of the received ID obtained by the received ID obtaining section 43 by taking into account a result of a comparison of the received ID obtained by the received ID obtaining section 43 and the ID stored in the fixed ID storage unit 46.

The received ID obtaining section 43 may obtain at least one ID of the variable ID transmission device 2 (hereinafter the IDs obtained by the received ID obtaining section 43 are referred to as a "received ID group"). In one aspect, the more IDs the received ID groups includes, the higher the accuracy of position detection and the higher the possibility that the received ID groups includes a beacon signal with high intensity. The received ID group may include the ID of at least one variable ID transmission device 2. Further, in some instances, positioning section 45 described below may use the ID of the fixed ID transmission device 1 for detecting a position of the positioning target terminal 3, and the positioning section 45 may use the ID of the variable ID transmission device 2 for detecting a position of the positioning target terminal 3 and for determining an authenticity of the position of the positioning target terminal 3.

In an embodiment, the received ID authenticity determination section 44 may establish a subject ID as an "authentic ID" based on a determination that the subject ID is stored as the latest ID in the transmission history of the ID in the variable ID storage unit 41. The subject ID may be included in IDs received by the received ID obtaining section 43. Since a predetermined communication time is necessary for one ID to be (i) transmitted from the positioning device 4 to the positioning target terminal 3 via variable ID transmission device 2 and (ii) returned from the positioning target terminal 3 to the positioning device 4, the received ID authenticity determination section 44 may take this communication time into account in order to determine the authenticity of an ID in a predetermined interval. For example, if the transmission start time point of an ID is 0:00:00, the predetermined interval is 5 seconds, and the communication time is 0.5 seconds, the received ID authenticity determination section 44 determines that the ID is authentic between 0:00:50 and 0:05:50. If the positioning device 4 receives a variable ID stored as a past ID in the transmission history of the ID, the received ID authenticity determination section 44 may determine that the ID is an "unauthentic ID". If the positioning device 4 does not receive a stored variable ID, the received ID authenticity determination section 44 determines that "authenticity determination is not possible." In some aspects, the results regarding authenticity may be output to the positioning target terminal 3 and the user can recognize the results by outputting to the positioning target terminal 3.

In some aspects, the positioning section 45 detects the position of the positioning target terminal 3 based on at least one ID obtained by the received ID obtaining section 43. The positioning section 45 obtains information indicative of an authenticity of the received ID, which may be determined by the received ID authenticity determination section 44. In a certain instance, the positioning device 4 may establish the correspondence between detecting positions (e.g., the position of the fixed ID transmission device 1 and/or the variable ID transmission device 2) and IDs in advance, and the positioning section 45 may detect the position based on the correspondence. Additionally or alternatively, the positioning device 4 may collect positions of the fixed ID transmission device 1 and/or the variable ID transmission device 2 in advance, and the positioning section 45 may detect the position based on the correspondence of a combination of the collected positions and received ID(s). Further, in additional aspects, the positioning device 4 may collect positions of the fixed ID transmission device 1 and/or the variable ID transmission device 2 in advance, and the positioning section 45 may detect the position based on the correspondence of a combination of the collected positions, received ID(s), and the reception intensity for each received ID. The positioning section 45 may, in some instances, determine the authenticity of the detected position based on the authenticity of received ID.

The fixed ID storage unit 46 may store the ID of the fixed ID transmission device 1.

In some aspects, the variable ID storage unit 41, the variable ID setting section 42, the received ID obtaining section 43, the received ID authenticity determination section 44, and the positioning section 45 provided to the positioning device 4 may be realized by the same device or by a plurality of devices. The variable ID storage unit 41, the variable ID setting section 42, the received ID obtaining section 43, the received ID authenticity determination section 44, and the positioning section 45 provided to the positioning device 4 may be realized separately on a plurality of devices as long as the devices are connected by a wired or wireless channel.

(Operation of Positioning System)

Figure 3:
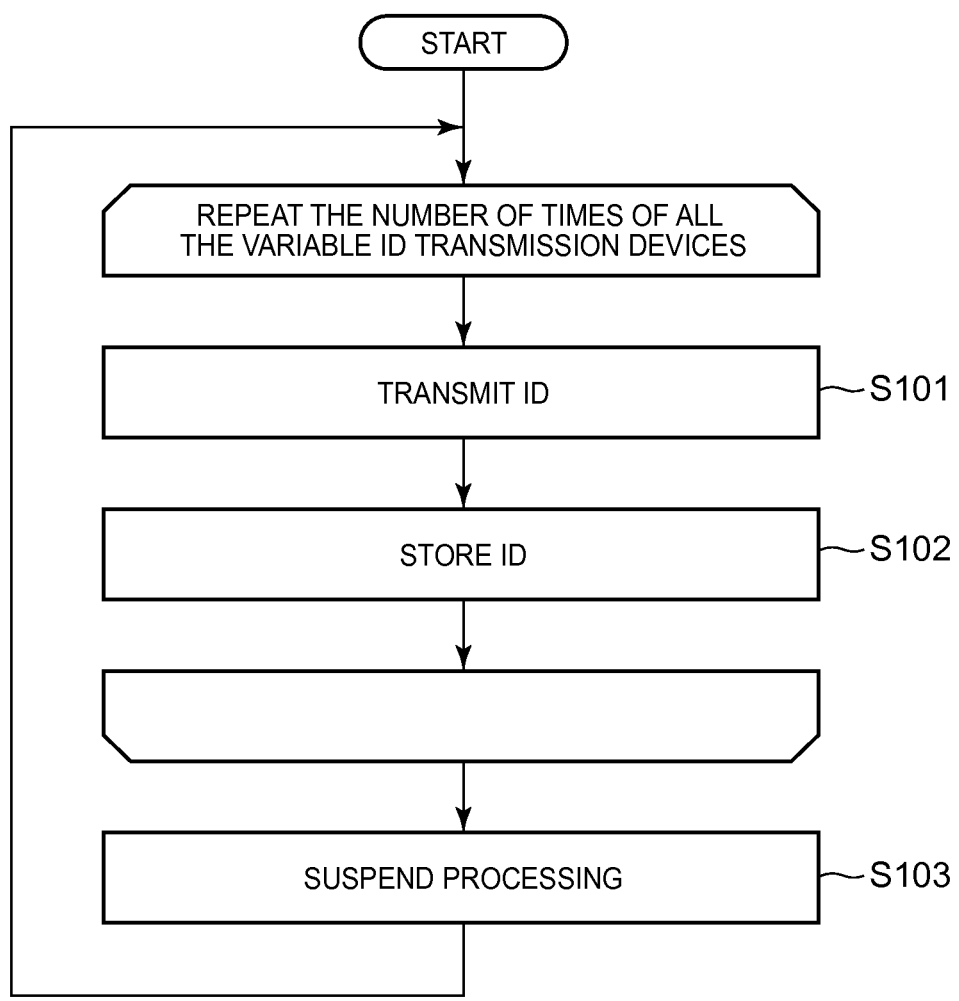
FIG. 3 is a flow chart showing an operation of the positioning system according to the first exemplary embodiment.

FIG. 3 is a flowchart illustrating an operation of an exemplary variable ID setting process performed by the positioning device 4 in the positioning system 100.

In step S101, the variable ID setting section 42 may generate a variable corresponding to a variable ID transmission device 2, and transmits an ID including the variable to the variable ID transmission device 2. In step S102, the variable ID setting section 42 may store the generated ID in the variable ID storage unit 41. In some aspects, steps S101 and S102 may be repeated until variable ID transmission and variable ID storing are completed for all the variable ID transmission devices 2 in positioning system 100.

In step S103, the variable ID setting section 42 may suspend processing for a predetermined or arbitrary period of time after completion of variable ID setting and variable ID storing described in steps s101 and s102 for the variable ID transmission devices 2. Upon expiration of the predetermined or arbitrary period of time, the variable ID setting section 42 may resume variable ID setting and variable ID storing for all the variable ID transmission devices 2. In some instances, the variable included in the ID to be transmitted by the variable ID transmission device 2 is regularly or irregularly changed. Further, during this period, the fixed ID transmission device 1 may transmit the same ID.

Figure 4:
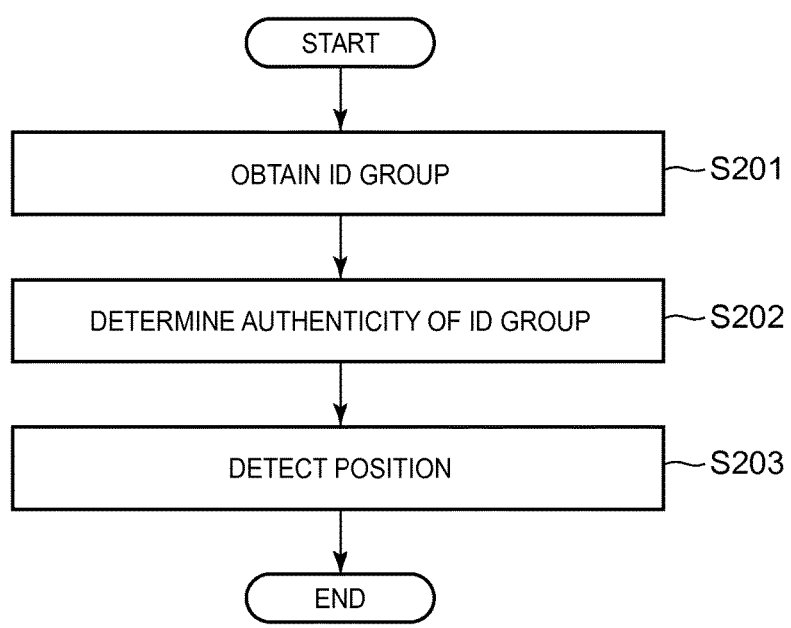
FIG. 4 is a flow chart showing an operation of the positioning system according to the first exemplary embodiment.

FIG. 4 is a flow chart of an exemplary authenticity determination process regarding the positioning target terminal 3 by the positioning device 4 in the positioning system 100.

In step S201, the received ID obtaining section 43 may obtain an ID group received by the positioning target terminal 3. In step S202, the received ID authenticity determination section 44 may determine the authenticity of the ID group obtained by the received ID obtaining section 43. In certain aspects, the received ID group may include the ID of the variable ID transmission device 2, and the variable included in the ID of the variable ID transmission device 2 may change regularly or irregularly. Thus, the received ID authenticity determination section 44 can determine the authenticity of the received ID at the positioning target terminal 3 based on whether the positioning target terminal 3 appropriately received the ID or not. The received ID authenticity determination section 44 may establish a subject ID as an "authentic ID" when the subject ID is stored as the latest ID in the transmission history of the ID in the variable ID storage unit 41. The subject ID may be included in IDs received by the received ID obtaining section 43. Further, by way of example, if the positioning device 4 receives a variable ID stored as a past ID in the transmission history of the ID, the received ID authenticity determination section 44 may determine that the ID is an "unauthentic ID". If the positioning device 4 does not receive a stored variable ID, the received ID authenticity determination section 44 may determine that "authenticity determination is not possible".

In step S203, the positioning section 45 may detect the position of the positioning target terminal 3 based on (i) a beacon signal included in each ID in the received ID group obtained by the received ID obtaining section 43 and (ii) information about the radio field intensity of the beacon signal. The positioning section 45 may perform the position detection process based on a received ID group including an ID determined by the received ID authenticity determination section 44 to be an "authentic ID". In other aspects, the positioning section 45 may perform the position detection process based on a received ID group including an ID determined by the received ID authenticity determination section 44 to be an "unauthentic ID" or one for which "authenticity determination is not possible" is determined.

In accordance with a first exemplary embodiment of positioning system 100, the received ID authenticity determination section 44 may determine the authenticity of a received ID, which is obtained by the received ID obtaining section 43. The authenticity of a detected position may thereby be determined, and falsification of the position of a positioning target terminal may be reduced or prevented.

In some instances, with the positioning system 100 according to the first exemplary embodiment, the positioning system 100 may include at least one variable ID transmission device for falsification prevention in communication with other devices commonly distributed in the market, e.g., a plurality of fixed ID transmission devices. Thus, a falsification prevention system may be constructed at a low cost.

In some instances, when the positioning system 100 displays a detected position to the user of the positioning target terminal or a third party, the positioning system 100 may present whether the detected position is authentic or not and whether falsification is performed or not by displaying the detected position and the authenticity of the detected position together. Furthermore, the positioning system 100 can deliver an advertisement or a coupon to the user, and can present information corresponding to the detected position to the user when the detected position is determined to be authentic.

<Second Exemplary Embodiment>

Figure 5:
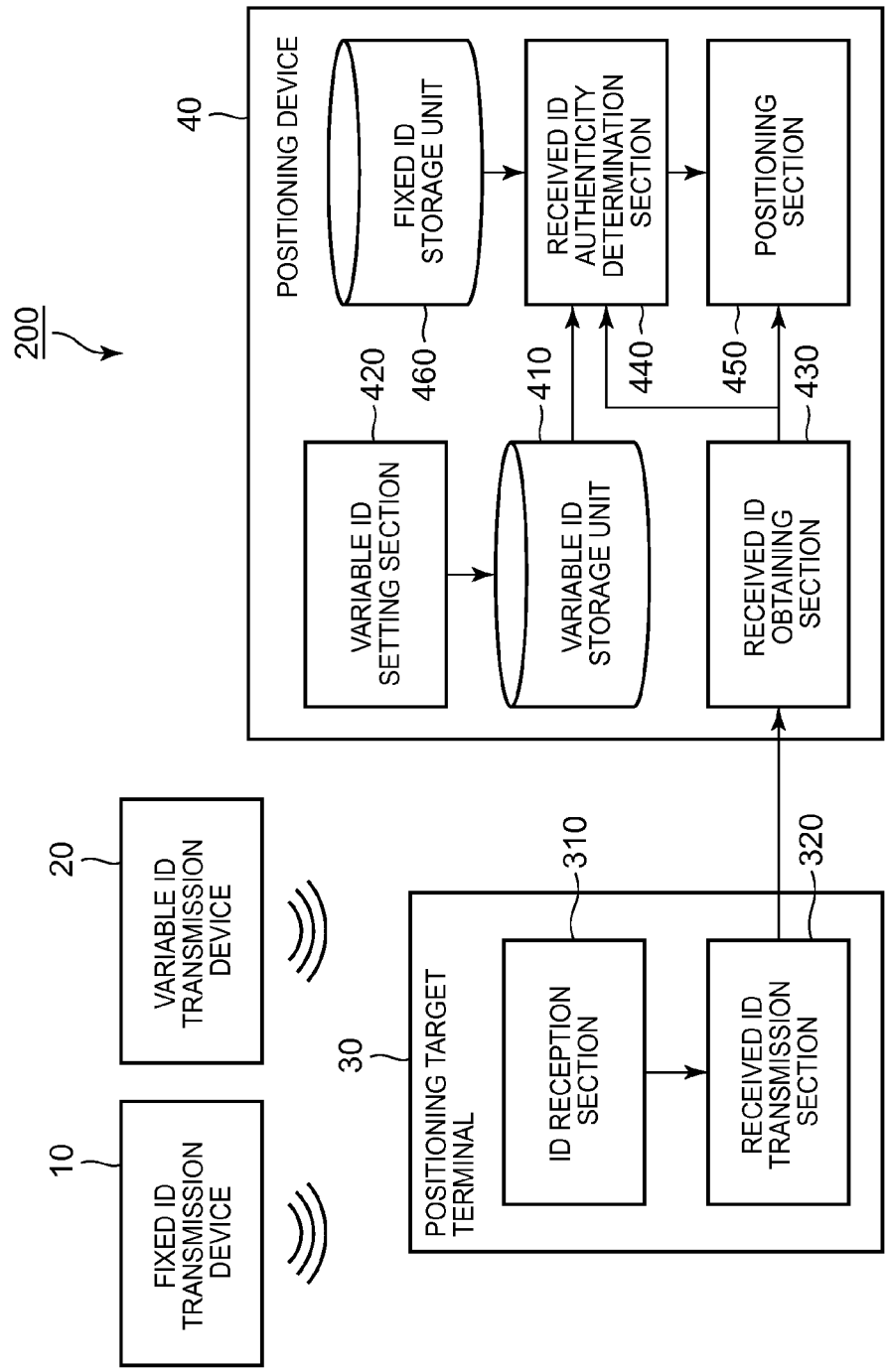
FIG. 5 is a structural diagram of internal blocks of each unit of a positioning system according to a second exemplary embodiment.

FIG. 5 is a diagram of an exemplary positioning system 200, according to a second exemplary embodiment. As illustrated in FIG. 5, the positioning system. 200 includes a fixed ID transmission device 10, a variable ID transmission device 20, a positioning target terminal 30, and a positioning device 40. The positioning target terminal 30 and the positioning device 40 may, for example, be connected by a wired or wireless network.

In some aspects, the variable ID transmission device 20 may transmit, by wireless communication, a signal that includes identification information that identifies a device installed in a surrounding environment. The identification information may, in certain instances, include a variable that the variable ID transmission device 20 may sequentially change according to a rule established in advance.

The positioning device 40 of FIG. 5 may include a variable ID storage unit 410, a variable ID setting section 420, a received ID obtaining section 430, a received ID authenticity determination section 440, and a positioning section 450. The variable ID setting section 420 may obtain the variable of the variable ID transmission device 20, which the variable ID transmission device 20 may sequentially change according to a rule established in advance, and may store an ID including the variable of the variable ID transmission device 20 in the variable ID storage unit 410.

In certain aspects, the rule set in advance for the variable ID transmission device 20 and the variable ID setting section 420 may establish a calculation formula, such as a one-way function or a random number generation function. The one-way function and the random number generation function are simple calculation formulas, but the calculation of their inverse functions is extremely difficult. The calculation function takes the variable before change as the input parameter, and takes the variable after change as an output of the calculation function. In some instances, an initial value of variable and the time to change may be set in advance as the rule. Additionally or alternatively, the changed variable may include a timestamp indicating the time to change.

Other devices and sections are similar to those described above in reference to the first exemplary embodiment, and description thereof will be omitted.

(Operation of Positioning System)

Figure 6:
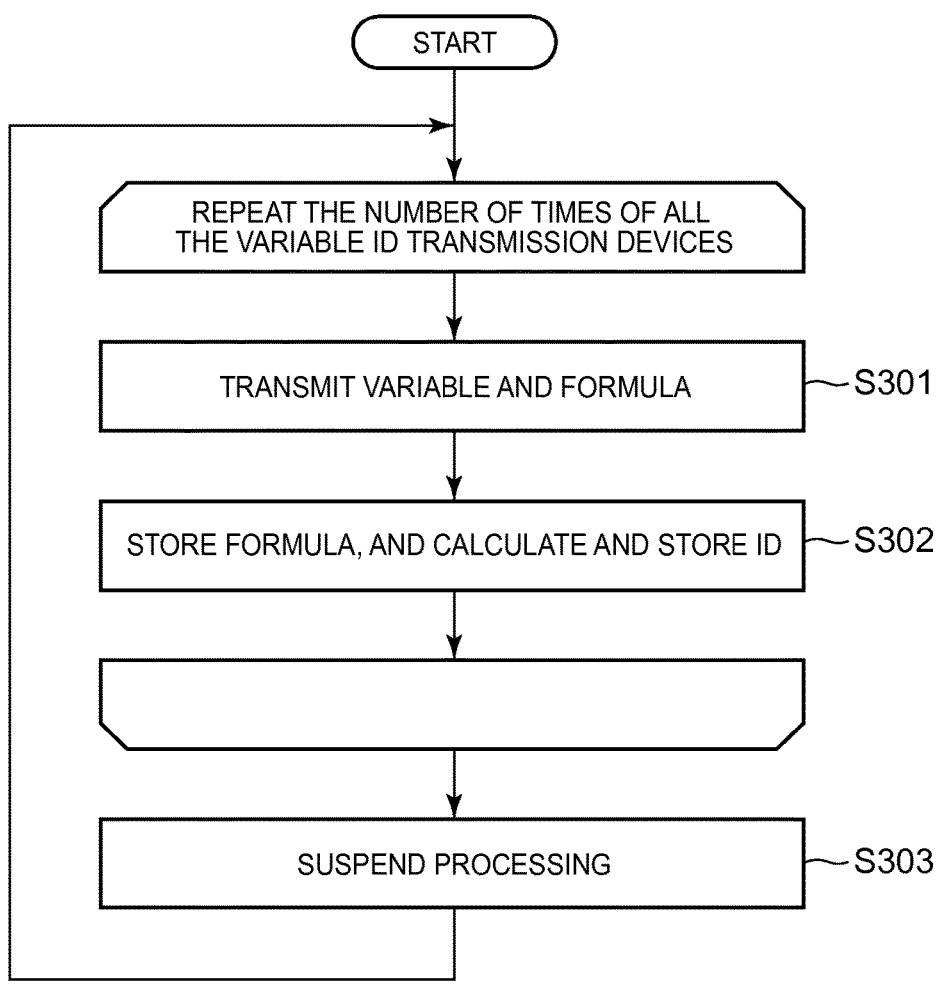
FIG. 6 is a flow chart showing an operation of the positioning system according to the second exemplary embodiment.

An operation for a variable ID setting process by the positioning device 40 in the positioning system 200 will be described with reference to the flow chart of FIG. 6.

In step S301, the variable ID setting section 420 may transmit an initial variable and a calculation formula for generating a following variable to the variable ID transmission device 20. In step S302, the variable ID setting section 420 stores the calculation formula above in the variable ID storage unit 410. The variable ID setting section 420 may calculate the variable by using the calculation formula in advance, and the variable ID setting section 420 may store the ID including the calculated variable in the variable ID storage unit 410. Additionally or alternatively, the variable ID storage unit 410 may calculate the variable by using the calculation formula before a predetermined time for changing the variable has elapsed. In certain aspects, steps S301 and S302 are repeated until initial ID setting and calculation formula storing are completed for all the variable ID transmission devices 20.

In step S303, the variable ID setting section 420 may suspend processing for a predetermined or arbitrary period of time after completion of initial variable setting and calculation formula storing for all the variable ID transmission devices 20. Upon expiration of the predetermined or arbitrary period of time, the variable ID setting section 420 calculates a new variable using the calculation formula and a parameter that includes the initial variable or the variable included in the previously transmitted ID of the variable ID transmission devices 20, and the variable ID setting section 420 stores the calculated variable in the variable ID storage unit 410. In some embodiments, the variable included in the ID to be transmitted by the variable ID transmission device 20 is regularly or irregularly changed.

Figure 7:
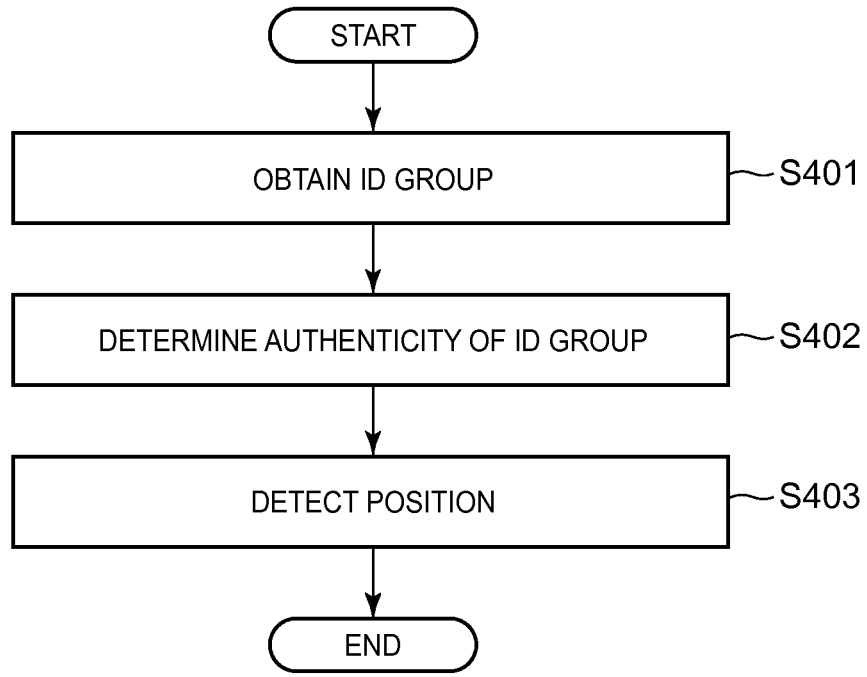
FIG. 7 is a flow chart showing an operation of the positioning system according to the second exemplary embodiment.

FIG. 7 is a flow chart illustrating an operation for an exemplary authenticity determination process regarding the positioning target terminal 30 by the positioning device 40 in the positioning system 200.

In step S401, the received ID obtaining section 430 obtains an ID group received by the positioning target terminal 30. In step S402, the received ID authenticity determination section 440 determines the authenticity of a received ID based on whether the ID of the variable ID transmission device 20 included in the received ID group corresponds to a latest ID stored in the variable ID storage unit 410.

Other processes are the same as those of the first embodiment, and description thereof will be omitted.

With the positioning system according to the second exemplary embodiment, the received ID authenticity determination section 440 may determine the authenticity of a received ID. The authenticity of a detected position may thereby be determined, and falsification of the position of a positioning target terminal may be reduced or prevented. Furthermore, by using a calculation formula in the generation of a variable by the variable ID setting section 420, the ID generation process may be simplified.

<Third Exemplary Embodiment>
(Positioning Device)

Figure 8:
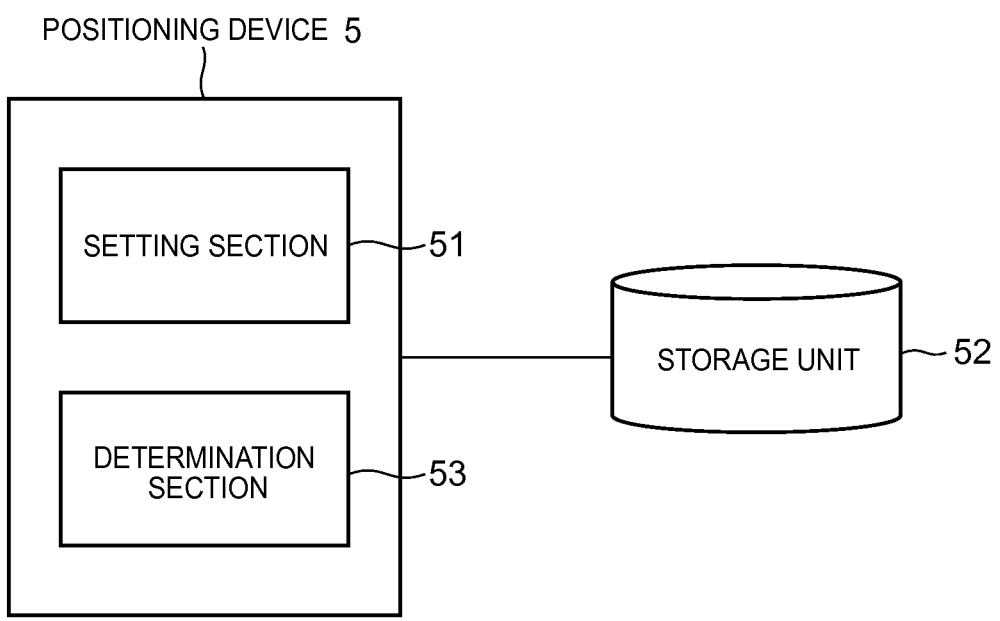
FIG. 8 is a structural diagram of a positioning device according to a third exemplary embodiment.

As illustrated in FIG. 8, a positioning device 5 according to a third exemplary embodiment is connected, in a manner capable of communication, to a positioning target terminal. In certain aspects, the positioning target terminal may correspond to a mobile communication terminal of a user. As illustrated in FIG. 8, the positioning device 5 may include a setting section 51, a storage unit 52, and a determination section 53.

The setting section 51 may change the variable included in the ID to be transmitted to the positioning target terminal at a predetermined interval. The storage unit 52 may store the ID to be transmitted. The determination section 53 may determine, in an instance where the ID received from the positioning target terminal matches the ID stored in the storage unit 52 in the predetermined interval, that the positioning target terminal is present at an authentic position. On the other hand, in casein instance where the ID received from the positioning target terminal matches the ID stored in the storage unit 52 outside the predetermined interval, the positioning target terminal is determined to be not present at an authentic position.

In some instances, with the positioning device according to the third exemplary embodiment, the determination section may determine the authenticity of a received ID, and may also determine the authenticity of the position of the positioning target terminal. Falsification of the position of the positioning target terminal may thereby be prevented.

What is claimed is:

1. A system for positioning a user device, the system comprising:
a first transmission device configured to regularly transmit a first variable to the user device, wherein the first variable includes a fixed value;
a second transmission device configured to regularly transmit a second variable to the user device,
wherein the second transmission device is configured to receive the second variable from a positioning device,
wherein the positioning device receives at least one of the first variable or the second variable from the user device; and
the positioning device, comprising:
a memory storing instructions; and
one or more processors configured to execute the instructions to cause the positioning device to:
change a value of the second variable at an interval and send to the second transmission device,
store the changed value of the second variable in the memory,
receive at least one of the first variable or the second variable sent from the user device, and
output a first signal indicating that the user device is present in a predetermined area when at least one of the fixed value of the received first variable or a value of the received second variable matches the changed value of the second variable stored in the memory.

2. The system for positioning a user device according to claim 1, wherein the one or more processors of the positioning device are configured to execute the instructions to cause the positioning device to
output the first signal in response to the value of the received second variable corresponding to a latest changed value of the second variable stored in the memory.

3. The system for positioning a user device according to claim 1, wherein the one or more processors of the positioning device are further configured to execute the instructions to cause the positioning device to
output a second signal indicating that the user device is not present in the predetermined area in response to the value of the received second variable corresponding to a previous changed value of the second variable stored in the memory.

4. The system for positioning a user device according to claim 1, wherein the one or more processors of the positioning device are further configured to execute the instructions to cause the positioning device to
output a third signal indicating that positioning of the user device in relation to the predetermined area is not possible in response to the value of the received second variable not corresponding to any of previously changed values of the second variable stored in the memory.

5. The system for positioning a user device according to claim 1, wherein the one or more processors of the positioning device are configured to execute the instructions to cause the positioning device to:
change the value of the second variable at a predetermined interval, and
output the first signal in response to receiving the second variable from the user device before the predetermined interval is elapsed.

6. The system for positioning a user device according to claim 1, wherein the one or more processors of the positioning device are configured to execute the instructions to cause the positioning device to:
change the value of the second variable at the predetermined interval, and
output the second signal indicating that the user device is not present in the predetermined area in response to receiving the second variable from the user device after the predetermined interval is elapsed.

7. A method for positioning a user device, wherein a first transmission device regularly transmits a first variable to the user device, the first variable including a fixed value, and a second transmission device regularly transmits a second variable to the user device, the second transmission device receiving the second variable from a positioning device, the method, performed by the positioning device, comprising:
 changing at an interval a value of the second variable and sending to the second transmission device;
 storing the changed value of the second variable in a memory;
 receiving at least one of the first variable or the second variable sent from the user device; and
 outputting a first signal indicating that the user device is present in a predetermined area when at least one of the fixed value of the received first variable or a value of the received second variable matches the changed value of the second variable stored in the memory.

8. The method for positioning a user device according to claim 7, wherein outputting the first signal includes:
 outputting the first signal in response to the value of the received second variable corresponding to a latest changed value of the second variable stored in the memory.

9. The method for positioning a user device according to claim 7, further comprising:
 outputting a second signal indicating that the user device is not present in the predetermined area in response to the value of the received second variable corresponding to a previous changed value of the second variable stored in the memory.

10. The method for positioning a user device according to claim 7, further comprising:
 outputting a third signal indicating that positioning of a position of the user device is not possible in response to the value of the received second variable not corresponding to any of previously changed values of the second variable stored in the memory.

11. The method for positioning a user device according to claim 7, wherein:
 changing the value of the second variable includes changing the value of the second variable at a predetermined interval,
 outputting the first signal includes outputting the first signal in response to receiving the second variable from the user device before the predetermined interval is elapsed.

12. The method for positioning a user device according to claim 7, wherein changing the value of the second variable includes changing the value of the second variable at the predetermined interval, the method further comprising:
 outputting the second signal in response to receiving the second variable from the user device after the predetermined interval is elapsed.

13. A non-transitory computer-readable medium storing instructions which, when executed, cause apparatus to perform operations for positioning a user device, wherein a first transmission device regularly transmits a first variable to the user device, the first variable including a fixed value, and a second transmission device regularly transmits a second variable to the user device, the second transmission device receiving the second variable from the apparatus, the operations comprising:
 changing at an interval a value of the second variable and sending to the second transmission device;
 storing the changed value of the second variable in a memory;
 receiving at least one of the first variable or the second variable sent from the user device; and
 outputting a first signal indicating that the user device is present in a predetermined area when at least one of the fixed value of the received first variable or a value of the received second variable matches the changed value of the variable stored in the memory.

\* \* \* \* \*